Nov. 13, 1962  D. J. MYNALL  3,064,169
POSITION SERVO SYSTEMS
Filed Nov. 23, 1959
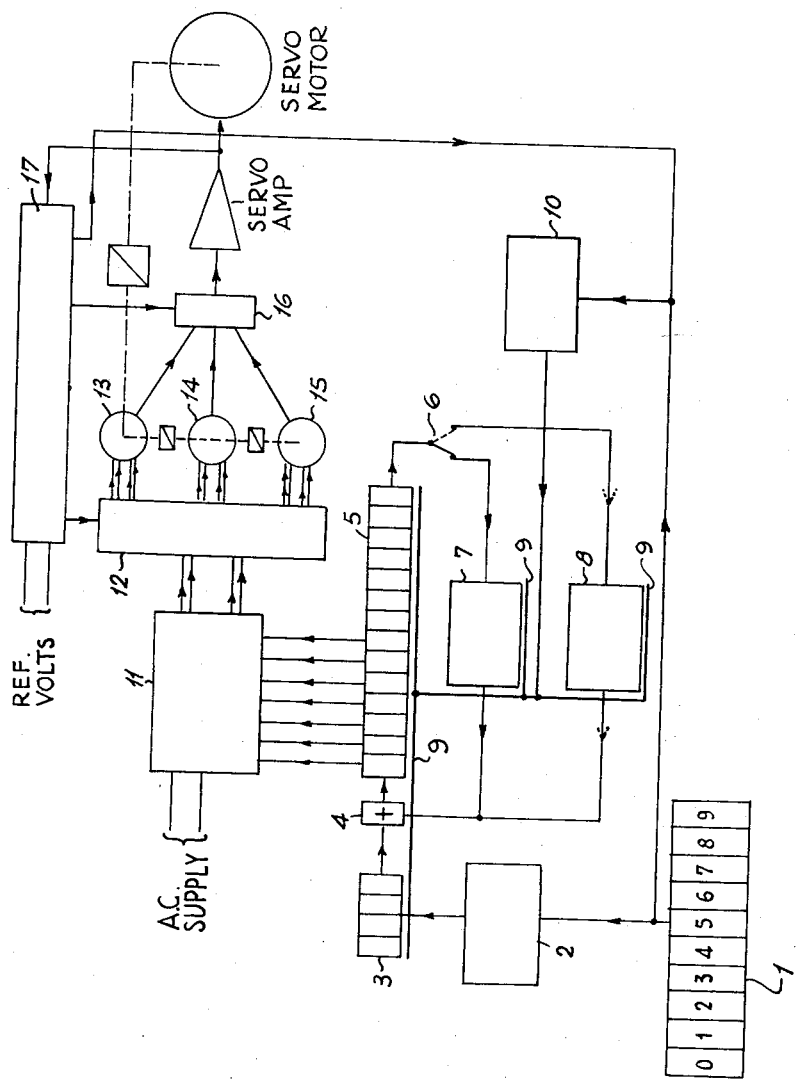
INVENTOR
DENNIS JAMES MYNALL
ATTORNEY United States Patent Office 3,064,169
Patented Nov. 13, 1962

3,064,169
POSITION SERVO SYSTEMS
Dennis James Mynall, Rugby, England, assignor to Associated Electrical Industries (Rugby) Limited, London, England, a company of Great Britain
Filed Nov. 23, 1959, Ser. No. 854,902
Claims priority, application Great Britain Nov. 25, 1958
4 Claims. (Cl. 318—28)

This invention relates to electric position control systems in which a member is driven into a predetermined linear or angular position by means of an electric motor (hereinafter referred to as a servo motor) under the control of input information of a digital character. The invention is particularly suitable for, although not exclusively adapted to, systems for the position control of machine tools.

A system of the kind under consideration may be employed in machine tools automatically to move the table, or the tool holder to a required position on the bed of the machine. In the known art selsyn (or synchro) links have been employed between the input setting control devices and the movable parts (tool holder or table) to be controlled, error signals developed by the receiver selsyns being utilised to control the rotation of a servo motor operating the movable part until the movable part has been driven into the required position, when the error signal is reduced to zero.

In this known system a series of selsyns are mechanically geared together in order to obtain the required accuracy, the servo motor causing all the receiver selsyns to rotate simultaneously and the error signals from the several selsyn links are employed successively according to their amplitudes.

The main object of the present invention is to provide a position setting arrangement in which the transmitter synchros and their setting mechanisms are replaced by an electrical circuit including a digital-to-analogue converter which converts digital information representing the desired setting into an analogue form for application to the receiver selsyn.

In a position setting arrangement according to the invention, a decimal digital input representing the linear or angular position to which setting is required is converted to an equivalent binary representation and stored in a binary shifting register, a continuous group of places in the register including that for the most significant digit being connected to a digital-analogue convertor adapted to produce alternating output voltages, the magnitudes of which are respectively related to the digital input by a sinusoidal and cosinusoidal function, the digital-analogue convertor being adapted to energise sequentially synchros geared together and controlling a servo motor which effects the motion of the device to be set, the motion of the servo motor being communicated to the moving element of the synchro so as progressively to reduce the controlling voltage applied by the synchro in control to the servo motor, together with means for detecting when the controlling voltage in each sequential synchro reaches a predetermined low value and thereupon for transferring control to the succeeding synchro whilst simultaneously shifting a group of binary digits of lesser significance into the places connected to the digital-analogue convertor.

The digital-analogue convertor is conveniently of the character described and claimed in copending application, Serial No. 748,469, filed July 14, 1958, by Dennis J. Mynall and Philip S. T. Buckerfield, now abandoned, and assigned to the assignee of the present application. The alternating voltages developed by such a convertor are suitable for energising the quadrature windings on synchros of the rotating type. When such synchros are so energised the single phase winding, which is generally on the rotatable element then produces an output voltage which is determined by the relative position of the rotatable element with respect to the resultant field set up by the quadrature windings. This output voltage is used to control the servo motor and the servo motor in turn rotates the rotatable element of the synchro so as to tend to bring the output voltage to zero. Since the use of the digital-analogue convertor in conjunction with a synchro in this manner avoids the use of a selsyn link of the well-known error voltage type, and the use of mechanical means for setting in the data, the operation of the system is to that extent simplified. The alternating voltages developed in the convertor are, however, also suitable for application to linear synchros, such as are described in Patent 2,942,212 to Dennis J. Mynall.

The decimal digital input may be introduced by manual means, or by a punched card or tape.

The system will now be described in greater detail with reference to a single linear position setting arrangement, but it should be appreciated that positions along the other linear axes could be determined in the same way. The system can, therefore, be used for the co-ordinate setting of a machine tool along the X, Y and Z axes.

A diagrammatic representation of the essence of the invention is shown in the accompanying drawing, and it should be realised that all the units are known, per se but as far as we are aware they have not previously been combined in this way or used for this purpose.

The system comprises a decimal digital input unit shown as a keyboard at 1. This is connected to a convertor 2, which converts a decimal digit to the corresponding binary digits, and unit 3 is a temporary store for these digits. Unit 3 is connected through an adding unit 4 to the shift register 5, the latter having two feed-back circuits alternatively selectable by means of the switch 6. In one feed-back circuit is a unit 7, the output of which is equal to the input multiplied by 10, for example a circuit of which the output is the sum of the binary input delayed by one digit and the binary input delayed by three digits. In the other feed-back circuit is a unit 8, which is a delay unit. The input shift line 9 is fed from a shift pulse generator 10, which is triggered in the first place by the release of one of the input keys and later in the sequence of operations when the servo misalignment circuit (hereinafter described) operates.

A predetermined number of places in the shift register at the most significant end are connected to a digital-to-analogue convertor 11, which may be of the kind described and claimed in copending application, Serial No. 748,469 above-mentioned, and the two output voltages from this, which are respectively sinusoidally and cosinusoidally related to the input number, are connected sequentially through a multi-position switch 12 to the synchros 13, 14 and 15.

The coarse synchro 13 is geared to the medium synchro 14 and the fine synchro 15, each gear ratio being a power of 2, dependent on the shift of the register between successive interrogations, and the output of the synchros are connected sequentially through a selector switch 16 to the servo amplifier. A servo misalignment circuit 17 detects the error voltage associated with each synchro in turn, and compares this error voltage with a reference voltage supplied from a separate source.

To simplify the explanation it will be assumed at first that the capacity of the binary shift register is only that required to store the binary digits representing the largest decimal input for which the system is designed. It will be shown later that this allows incorrect operation which can be eliminated by increasing the capacity.

In the present example it is assumed that the unit dimension is 0.0001" and that the range of the system is required to be from 0 to 0.9999". Each decimal digit is represented by four digits in the pure binary code, and the necessary capacity of the shift register to contain the whole decimal input in this first explanation is 14 places.

The operation of this system based on the above assumption is as follows. When the key corresponding to the most significant decimal digit is depressed the corresponding binary digits are provided by the unit 2 and stored in the unit 3. When the key is released it triggers the shift pulse generator 10, which produces a predetermined number, 14 in this instance, of successive pulses to move the binary digits through the total capacity of the shift register.

When the key corresponding to the second most significant digit is depressed it is again converted into binary digits and stored in unit 3. When the key is released, however, the binary digits already stored in the register are fed back to the input through unit 7, where they are multiplied by ten and added in unit 4 to the binary digits being transferred from unit 3 to the shift register 5.

The same action occurs when the keys representing the next two digits are depressed and released, that is each time the binary digits already in the register are multiplied by ten and added to the new binary digits being transferred from unit 3, so that the final content of the register is the binary representation of the decimal input.

A reference to copending application, Serial No. 748,469, above-mentioned, will show that the magnitudes of the output voltages of the digital-to-analogue convertor, described therein, are related respectively "sinusoidally" and cosinusoidally to the input number, which input number is represented by the binary digits in the group including the most significant digit in the places in the shift register connected to the convertor 11. The switch 12 is arranged initially to connect these two output voltages to respective windings spaced at 90° on the coarse synchro 13.

With this part of the system so set up the whole system is now energised either manually or automatically, and simultaneously the state of switch 6 is changed to that shown by the dotted line. Switch 16 is arranged to connect the coarse synchro 13 to the servo system, and the servo misalignment circuit 17 is arranged to detect the error voltage. When the error voltage, as measured by unit 17, is reduced to a predetermined value, it indicates that the remaining position error is within the range of the medium synchro 14. Switches 12 and 16 are then automatically operated to transfer control to the synchro 14, and the shift pulse generator is also triggered.

The shift pulse generator then produces 14 successive pulses as before, but because the state of the switch 6 has been changed the circuit now includes the delay unit 8, which introduces a delay of a predetermined number of digits, the predetermined number being related to the gear ratio between the synchros. Thus the binary digits in the places in the shift register are moved by this predetermined number towards the most significant end. In this way a group of less significant binary digits is provided as the input to the digital to analogue convertor 11, so that the synchro 14 is supplied with voltages appropriate to its range of operation.

The servo misalignment circuit is transferred, also by means of switch 16, to measure the error voltage in the medium synchro circuit, and again when this is reduced to a predetermined value the previous operation is repeated, and control is transferred to the fine synchro 15.

If the desired accuracy of operation can be achieved by employing only two synchros, the use of the synchro 15 will be rendered superfluous. Alternatively, if a greater degree of accuracy or a greater number of input digits is to be employed, one or more further synchros controlled through switches 12 and 16 may be incorporated into the equipment. The above description must therefore be read with these possible changes in mind.

In an arrangement in which the synchro 15 is in linear form, as, for example, described in Patent 2,942,212, above-mentioned, it will be understood that the effective gear ratio between this synchro and the next in the series is the number of complete cycles of operation of the finer synchro corresponding to one cycle of operation of the coarser synchro.

The angular displacement of the coarse synchro corresponding to the full range of decimal input must be confined to less than half a revolution in order to ensure that initial movement is in the required direction. This requires that the binary input to the digital-to-analogue convertor be similarly confined, and this can be achieved by providing an additional binary place at the most significant end of the register which will initially always contain a zero, thus limiting the sinusoidal and cosinusoidal outputs of the digital-to-analogue convertor to less than half cycle of variation of magnitude.

While the extension of the binary register by one place is sufficient to meet this requirement, it may be an advantage in some practical circumstances to extend the register by more than one place. It will be understood that the number of pulses produced by the shift pulse generator must correspond to the total number of places in the lengthened register.

The shift register may be a circuit comprising valves or transistors or ferrite cores, and the digital to analogue convertor could be, although is not necessarily, in the form described in copending application, Serial No. 748,469, above-mentioned.

Although in the example described the decimal digits are introduced manually, they could obviously be introduced from a punched tape or card. If a punched tape were used it could be moved through the "reader" to introduce the decimal digits sequentially as is necessary in the system according to the invention, but clearly if the information were presented in parallel, such as on a punched card for instance, electronic scanning could be provided to pick off the digits in the required sequence.

What I claim is:

1. A position setting arrangement comprising a decimal digital input unit having means for setting said unit in accordance with a decimal dimension to whch a member is to be set, a convertor for converting said decimal input to a corresponding binary digital input, a store unit for said binary digital input, an adding unit, a binary shifting register connected to said store unit through said adding unit, a digital-to-analogue convertor, means connecting a continuous group of places including that for the most significant digit in said shifting register to said digital-to-analogue convertor to produce alternating output voltages, the magnitudes of which are respectively related to said digital input by a sinusoidal and a cosinusoidal function, a servo motor connected to operate a device to be set positionally, means for energizing from said digital-to-analogue convertor synchros geared together and controlling said servo motor to effect the motion of said device, means communicating the motion of said servo motor to the moving element of each synchro in turn to as progressively to reduce the controlling voltage applied by the synchro in control to said servo motor, and means for detecting when said controlling voltage in each sequential synchro reaches a predetermined low value and thereupon for transferring control to the succeeding synchro while simultaneously shifting a group of binary digits of lesser significance in said register into the places connected to said digital-to-analogue convertor, said decimal-digital input unit being provided with keys operable to set successive digits of said dimension into said unit in order of decreasing significance, the release of each said key triggering a shift-pulse generator to produce successive pulses to move the binary digits stored in said shifting register through the total capacity of said register.

2. A position setting arrangement according to claim 1, having a source of reference voltage, means for comparing said controlling voltage with the voltage of said source, switching means for transferring control from one synchro to another when the difference between the voltage of said source and said controlling voltage is a minimum, a shift-pulse generator, and means for triggering said shift-pulse generator simultaneously with the operation of said switching means to cause a group of binary digits of lesser significance to be moved towards the most significant end of said register.

3. A position setting arrangement according to claim 1, having a feed-back multiplying unit connected to the said shifting register through which binary digits displaced from said register by said shift-pulse generator are fed back to the input of said register after multiplication by ten and are added to the binary digits stored therein.

4. A position setting arrangement according to claim 3, having a feed-back delay unit connected to said shifting register, and switching means for transferring control from said feed-back multiplying unit to said feed-back delay unit simultaneously with the transfer of the control of said servo motor from one synchro to another.

References Cited in the file of this patent

UNITED STATES PATENTS

| | | |
|---|---|---|
| 2,537,427 | Seid et al. | Jan. 9, 1951 |
| 2,560,337 | Fouassin | July 10, 1951 |
| 2,769,125 | Jacobi | Oct. 30, 1956 |
| 2,848,670 | Kelling et al. | Aug. 19, 1958 |